Patented Oct. 17, 1922.

1,432,585

UNITED STATES PATENT OFFICE.

CLINTON D. ABRAHAM, DECEASED, LATE OF WILMINGTON, DELAWARE, BY CHESTER H. ROSS, ADMINISTRATOR, OF WILMINGTON, DELAWARE, ASSIGNOR TO E. I. DU PONT DE NEMOURS & COMPANY, OF WILMINGTON, DELAWARE, A CORPORATION OF DELAWARE.

MATERIAL FOR MINE-VENTILATING TUBING.

No Drawing. Application filed June 25, 1921. Serial No. 480,429.

*To all whom it may concern:*

Be it known that CLINTON D. ABRAHAM, deceased, late a citizen of the United States, and a resident of Wilmington, in the county of New Castle and State of Delaware, has invented a certain new and useful Material for Mine-Ventilating Tubing, of which the following is a specification.

This invention relates to mine-ventilating tubing, and comprises, as a new tubing material, a fabric coated with rubber composition having constituents which impart fungicidal and acid-resistant properties to said composition.

The principal object of the invention is to provide mine-ventilating tubing which will be capable of withstanding for long periods the destructive conditions to which such tubing is ordinarily exposed.

In order to insure proper ventilation in mines, it is necessary to force fresh air under pressure into the mine shafts through flexible tubes approximately 12″ in diameter. These flexible tubes must be made of material which is slow burning, which is resistant to a 3% sulphuric acid drip, and which is unaffected by a fungus growth which thrives in the mines. The particular form of fungus growth referred to appears to thrive best at a temperature of 90° F. and in a humid atmosphere, which conditions are nearly always found in the mines.

In the course of an investigation to find a tubing material which would satisfactorily meet the requirements above outlined, it was discovered that a fabric coated, and preferably thoroughly impregnated, with a rubber composition gave the best results. In addition to the rubber itself, the essential constituents of the composition are a fungicide and an acid-resistant. Ordinarily, the presence of non-inflammable substances in substantial proportions is also desirable.

The fungicidal ingredient of the rubber composition may be, for example, pine tar or coal tar. The acid-resistant ingredient may be paraffin or other chemically inert substance of similar physical consistency. For the non-inflammable ingredient there may be used such materials as asbestos flour, barytes, silex, lithopone, etc.

The formula of a satisfactory coating composition is as follows:

| | Parts. |
|---|---|
| Rubber | 41 |
| Pine tar | 5 |
| Paraffin | 6 |
| Asbestos flour | 19 |
| Barytes | 52 |

The amount of pine tar should preferably be between 5 and 15%, and of paraffin, between 3 and 20%, both based on the weight of rubber present. The inorganic constituents may vary within a wide range.

The rubber used is preferably an uncured high grade rubber and may consist in part of plantation smoked sheet rubber and in part of reclaimed rubber.

The flexible base to which a composition of the above character is applied may consist of a suitable fabric such as a duck, a drill, or an Osnaburg, preferably more than 8 ounces per square yard in weight.

In manufacturing the tubing material the following procedure has been found satisfactory:

The coating composition is dissolved in gasoline to produce a cement containing approximately 65% solids by weight. The fabric is thoroughly impregnated with this cement, using for instance a two roll type of impregnator, and top coats of the same cement and then applied to both sides of the fabric by means of a regular spreading machine until the desired weight of coating is obtained on the fabric. After drying, the material is finished on both sides with French talc, in order to remove the characteristic "tack" from the surfaces of the material. It is not necessary to vulcanize the coated material since it gives satisfactory service in the uncured state.

Although in the above example the fabric was coated on both sides, good results are obtained by applying the coating only to the surface of the fabric which corresponds with the outside of the mine-ventilating tubing.

Mine-ventilating tubing made from the above-described rubber-coated fabric is resistant to weak (that is, dilute) acid and alkaline solutions such as are commonly present in mines; is impervious to water; is unaffected by fungus growth; and is not readily inflammable. The new tubing has been found to last many times as long as the tubing ordinarily used at the present time. This increase in durability was demonstrated by placing the new ventilating tubing in a mine on the 1600 foot level, the location being a spot where the worst conditions in the mine could be found for fungus growth, water seepage, and heat (110° F.). When last examined, after being in the above location for about 8 months, the tubing showed practically no deterioration. The tubings now in common use on the other hand need to be renewed, when subjected to similar conditions, in from two weeks to two months.

The invention has been described above in considerable detail, but it will be understood that various changes may be made therein without departing from the spirit or scope thereof.

What is claimed is:

1. As a new article of manufacture, mine-ventilating tubing material comprising a fabric base having a coating consisting primarily of rubber and being strongly resistant to the action of the fungi and the dilute acids which are frequently present in mines.

2. As a new article of manufacture, mine-ventilating tubing material comprising a fabric base having a coating containing rubber, a fungicide, and a substance capable of shielding the remainder of the coating from the action of dilute acids.

3. As a new article of manufacture, mine-ventilating tubing material comprising a faric base having a coating containing rubber, pine tar, and paraffin.

4. As a new article of manufacture, mine-ventilating tubing material comprising a fabric base having a coating containing 100 parts of rubber, from 5 to 15 parts of pine tar, and from 3 to 20 parts of paraffin.

5. An article as specified in claim 2 in which the coating contains also a fire-resistant material.

6. An article as specified in claim 2 in which the coating contains also a fire resistant material comprising barytes.

7. An article as specified in claim 3 in which the coating contains also a fire-resistant material.

8. An article as specified in claim 3 in which the coating contains also a fire-resistant material comprising barytes.

9. An article as specified in claim 4 in which the coating contains also a fire-resistant material.

10. An article as specified in claim 4 in which the coating contains also a fire-resistant material comprising barytes and asbestos flour.

11. As a new article of manufacture, mine ventilating tubing material comprising a fabric base thoroughly impregnated and coated with a rubber composition containing a fungicide and paraffin, at least part of the rubber being unvulcanized.

12. As a new article of manufacture, mine-ventilating tubing material comprising a fabric base thoroughly impregnated and and coated with a rubber composition containing a fungicide, paraffin, and a fire-resistant material, at least part of the rubber being unvulcanized.

13. Ventilating tubing made of rubber-coated fabric strongly resistant to the action of fungi and dilute acids.

14. Ventilating tubing made of rubber-coated fabric, the rubber containing pine tar, paraffin, and a fire-resistant material, the proportions of pine tar and paraffin being sufficient to render the tubing practically immune to fungus growths and dilute acids such as frequently exist in mines.

15. As a new article of manufacture, mine-ventilating tubing material comprising a fabric base having a coating containing rubber and a fungicide to render the coating strongly resistant to the action of the fungi which are frequently present in mines.

16. Ventilating tubing made of rubber-coated fabric, the rubber coating of which contains a substance that renders said coating strongly resistant to the action of fungi which are frequently present in mines.

17. As a new article of manufacture, mine-ventilating tubing material comprising a fabric base thoroughly impregnated and coated with a rubber composition containing a fungicide, at least part of the rubber being unvulcanized.

In testimony whereof I affix my signature.

CHESTER H. ROSS,
*Administrator of Clinton D. Abraham, deceased.*